(12) United States Patent
Beyers et al.

(10) Patent No.: US 7,835,300 B2
(45) Date of Patent: *Nov. 16, 2010

(54) NETWORK DIAGNOSTIC SYSTEMS AND METHODS FOR HANDLING MULTIPLE DATA TRANSMISSION RATES

(76) Inventors: Timothy M. Beyers, 2489 Harrison St., San Francisco, CA (US) 94110; Kenneth R. Hornyak, 5236 Hecker Ct., San Jose, CA (US) 95135

( * ) Notice: Subject to any disclaimer, the term of this patent is extended or adjusted under 35 U.S.C. 154(b) by 226 days.

This patent is subject to a terminal disclaimer.

(21) Appl. No.: 11/851,788

(22) Filed: Sep. 7, 2007

(65) Prior Publication Data

US 2008/0181129 A1 Jul. 31, 2008

Related U.S. Application Data

(60) Provisional application No. 60/886,893, filed on Jan. 26, 2007.

(51) Int. Cl.
*H04L 12/26* (2006.01)

(52) U.S. Cl. .......................... 370/253; 370/538; 398/25

(58) Field of Classification Search ........................ None
See application file for complete search history.

(56) References Cited

U.S. PATENT DOCUMENTS

| | | | |
|---|---|---|---|
| 6,229,794 B1 * | 5/2001 | Willard et al. ............... 370/328 |
| 6,295,272 B1 * | 9/2001 | Feldman et al. ............. 370/210 |
| 6,880,070 B2 | 4/2005 | Gentieu et al. |
| 6,929,272 B2 | 8/2005 | Matsumoto et al. |
| 6,941,482 B2 | 9/2005 | Strong |
| 7,007,208 B1 | 2/2006 | Hibbert et al. |
| 7,206,831 B1 | 4/2007 | Dubé et al. |
| 7,218,901 B1 | 5/2007 | Mobley et al. |
| 7,228,348 B1 | 6/2007 | Farley et al. |
| 7,516,046 B2 * | 4/2009 | Lawson et al. ............... 702/183 |
| 7,599,293 B1 | 10/2009 | Bain et al. |
| 2003/0053493 A1 | 3/2003 | Mobley et al. |
| 2003/0134631 A1 * | 7/2003 | Snyder et al. ............... 455/423 |
| 2004/0133733 A1 | 7/2004 | Bean et al. |
| 2005/0050190 A1 | 3/2005 | Dube |
| 2005/0060402 A1 | 3/2005 | Oyadomari et al. |
| 2005/0060403 A1 | 3/2005 | Bernstein et al. |
| 2005/0060409 A1 | 3/2005 | Dube et al. |
| 2005/0078606 A1 | 4/2005 | Bernstein et al. |
| 2005/0141565 A1 | 6/2005 | Forest et al. |
| 2005/0177773 A1 * | 8/2005 | Hadley et al. .................. 714/38 |
| 2006/0198312 A1 | 9/2006 | Schondelmayer et al. |
| 2006/0198318 A1 | 9/2006 | Schondelmayer et al. |
| 2006/0198319 A1 | 9/2006 | Schondelmayer et al. |
| 2006/0200711 A1 | 9/2006 | Schondelmayer et al. |
| 2007/0263649 A1 | 11/2007 | Cuni et al. |
| 2008/0195897 A1 * | 8/2008 | Alaniz et al. .................. 714/46 |

OTHER PUBLICATIONS

Integrated Circuit Systems, Inc.; ICS8431-21 Datasheet; Sep. 30, 2003; 16 pages.

(Continued)

*Primary Examiner*—Chi H. Pham
*Assistant Examiner*—Shick Hom

(57) ABSTRACT

A network diagnostic system may include a network diagnostic module. The network diagnostic module may be configured to generate one or more network diagnostic statistics. The network diagnostic module may be configured to automatically handle multiple data transmission rates.

15 Claims, 8 Drawing Sheets

OTHER PUBLICATIONS

Integrated Circuit Systems, Inc.; ICS8431-21 Datasheet; Jul. 30, 2004; 16 pages.
Integrated Circuit Systems, Inc.; ICS8431-21 Datasheet; Apr. 27, 2005; 17 pages.
Integrated Circuit Systems, Inc.; ICS8431-11 Datasheet; Jun. 20, 2003; 17 pages.
Integrated Circuit Systems, Inc.; ICS8431-11 Datasheet; Oct. 21, 2004; 17 pages.
Integrated Circuit Systems, Inc.; ICS84314 Datasheet; Feb. 4, 2004; 18 pages.
Integrated Circuit Systems, Inc.; ICS84314 Datasheet; Nov. 5, 2004; 18 pages.
Finisar Corporation; SAN QoS ProbeFC Datasheet; Apr. 25, 2002; 2 pages.
Finisar Corporation; Finisar Introduces New Network Analyzer Platform Solutions to Advance Fibre Channel and SAN Development; Apr. 6, 2004; 2 pages.
Finisar Corporation; Xgig Analyzer Blades Hardware Guide; Apr. 8, 2004; 22 pages.
Finisar Corporation; Xgig Analyzer User's Guide: Fiber Channel, Infiniband, Gig-E; Apr. 8, 2004; 124 pages.
Finisar Corporation; Xgig Analyzer 1.6; http://web.archive.org/web/20040619224501/www.finisar.com/nt/documents/Xgig1.6Final_000.pdf; Jun. 19, 2004; 4 pages.
Finisar Corporation; Analyze; URL: http://web.archive.org/web/20040816074938/www.finisar.com/nt/xgig.php; Aug. 16, 2004; 1 page.
Internet Archive, Frequently Asked Questions; http://www.archive.org/about/faqs.php; downloaded from the Internet on Nov. 9, 2006; 48 pages.
U.S. Appl. No. 10/424,363, filed Apr. 25, 2003, Bain et al.
U.S. Appl. No. 10/424,364, filed Apr. 25, 2003, Bain et al.
U.S. Appl. No. 10/424,361, filed Apr. 25, 2003, Foster et al.
U.S. Appl. No. 10/448,670, filed May 30, 2003, Cichetti et al.
U.S. Appl. No. 10/448,827, filed May 30, 2003, Garcia et al.
U.S. Appl. No. 10/764,218, filed Jan. 23, 2004, Durham et al.
Office Action, U.S. Appl. No. 11/344,829, May 6, 2008.
Notice of Allowance, U.S. Appl. No. 11/344,829, Nov. 21, 2008.

* cited by examiner

NETWORK DIAGNOSTIC SYSTEMS AND METHODS FOR HANDLING MULTIPLE DATA TRANSMISSION RATES

CROSS-REFERENCE TO RELATED APPLICATIONS

This application claims priority to and the benefit of U.S. provisional patent application Ser. No. 60/886,893, which was filed on Jan. 26, 2007 and entitled NETWORK DIAGNOSTIC SYSTEMS AND METHODS FOR HANDLING MULTIPLE DATA TRANSMISSION RATES, the disclosure of which is incorporated by reference herein in its entirety.

BACKGROUND OF THE INVENTION

1. Field of the Invention

The present invention relates generally to networking systems. More particularly, embodiments of the invention relate generally to the testing of high speed data transmission systems and components.

2. Background Technology

Computer and data communications networks continue to proliferate due to declining costs, increasing performance of computer and networking equipment, and increasing demand for communication bandwidth. Communications networks including wide area networks ("WANs"), local area networks ("LANs"), metropolitan area networks ("MANs"), and storage area networks ("SANs") allow increased productivity and use of distributed computers or stations through the sharing of resources, the transfer of voice and data, and the processing of voice, data and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has developed to the point that many different physical configurations presently exist. Examples include Gigabit Ethernet ("GE"), 10 GE, Fiber Distributed Data Interface ("FDDI"), Fibre Channel ("FC"), Synchronous Optical Network ("SONET") and InfiniBand networks. These networks, and others, typically conform to one of a variety of established standards, or protocols, which set forth rules that govern network access as well as communications between and among the network resources. Typically, such networks utilize different cabling systems, have different characteristic bandwidths and typically transmit data at different speeds. Network bandwidth, in particular, has been the driving consideration behind many advancements in the area of high speed communication systems, methods and devices.

For example, the ever-increasing demand for network bandwidth has resulted in the development of technology that increases the amount of data that can be pushed through a single channel on a network. Advancements in modulation techniques, coding algorithms and error correction have vastly increased the rates at which data can be transmitted across networks. For example, a few years ago, the highest rate that data could travel across a network was at about one gigabit per second. This rate has increased to the point where data can travel across Ethernet and SONET networks at rates as high as 10 gigabits per second, or faster.

As communication networks have increased in size, speed and complexity however, they have become increasingly likely to develop a variety of problems that, in practice, have proven difficult to diagnose and resolve. Such problems are of particular concern in light of the continuing demand for high levels of network operational reliability and for increased network capacity.

The problems generally experienced in network communications can take a variety of forms and may occur as a result of a variety of different circumstances. Examples of circumstances, conditions and events that may give rise to network communication problems include the transmission of unnecessarily small frames of information, inefficient or incorrect routing of information, improper network configuration and superfluous network traffic, to name just a few. Such problems are aggravated by the fact that networks are continually changing and evolving due to growth, reconfiguration and introduction of new network topologies and protocols. Moreover, new network interconnection devices and software applications are constantly being introduced and implemented. Circumstances such as these highlight the need for effective, reliable, and flexible diagnostic mechanisms.

SUMMARY

A need therefore exists for systems and methods that eliminate or reduce the disadvantages and problems listed above and/or other disadvantages and problems.

In one embodiment, a network diagnostic system may comprise a network diagnostic module. The network diagnostic module may be configured to generate one or more network diagnostic statistics. The network diagnostic module may be configured to, when connected to a first link transmitting data at a first data transmission rate, automatically apply the first data transmission rate to receive first data from the first link and generate one or more network diagnostic statistics using at least a portion of the first data. The network diagnostic module may be configured to, when disconnected from the first link and connected to a second link transmitting data at a second data transmission rate that is different from the first data transmission rate, automatically apply the second data transmission rate to receive second data from the second link and generate one or more network diagnostic statistics using at least a portion of the second data.

In one embodiment, a network diagnostic system may comprise a network diagnostic module. The network diagnostic module may include a message receiving module. The message receiving module may be configured to, when disconnected from a first link transmitting data at a first data transmission rate and connected to a second link transmitting data at a second data transmission rate that is different from the first data transmission rate, automatically apply the second data transmission rate to receive first data from the second link. The network diagnostic module may also include a statistics module. The statistics module may be configured to generate one or more network diagnostic statistics using at least a portion of the first data from the second link.

For purposes of summarizing, some aspects, advantages and features of some embodiments of the invention have been described in this summary. Not necessarily all of (or any of) these summarized aspects, advantages or features will be embodied in any particular embodiment of the invention. Some of these summarized aspects, advantages and features and other aspects, advantages and features may become more fully apparent from the following detailed description and the appended claims.

BRIEF DESCRIPTION OF THE DRAWINGS

The appended drawings contain Figures of preferred embodiments to further clarify the above and other aspects, advantages and features. It will be appreciated that these drawings depict only preferred embodiments of the invention and are not intended to limit its scope. These preferred embodiments will be described and explained with additional specificity and detail through the use of the accompanying drawings in which.

DETAILED DESCRIPTION OF THE PREFERRED EMBODIMENTS

Certain embodiments relate generally to networking systems, including the testing of high speed data transmission systems and components. Embodiments of the invention may be used in other contexts unrelated to testing systems and components and/or unrelated to high speed data transmission.

Exemplary Networking System

Figure 1:
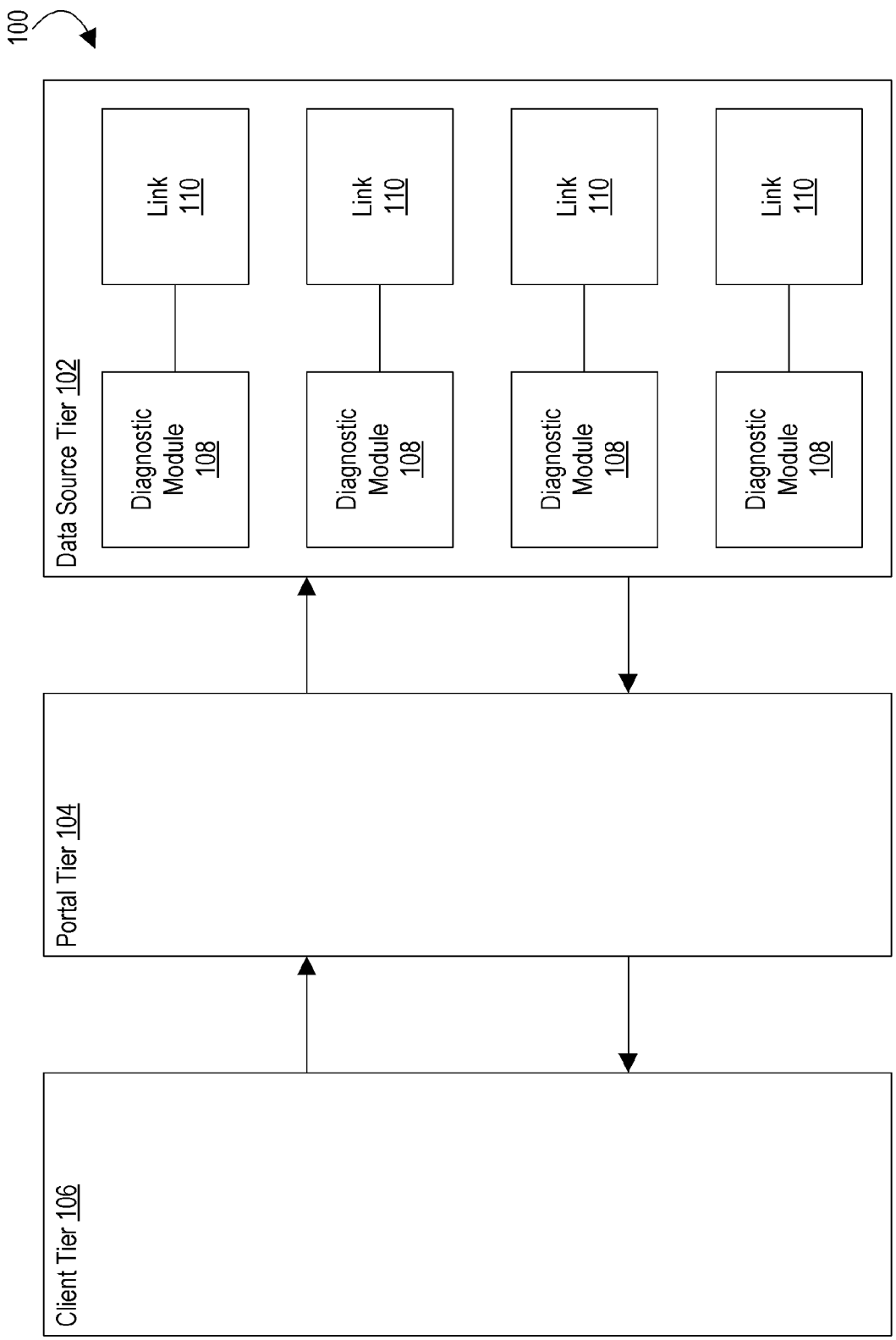
FIG. 1 is a block diagram of an exemplary embodiment of a networking system.

FIG. 1 is a block diagram of an exemplary networking system 100. The networking system 100 may comprise a network, network diagnostic system, a network testing system, or the like. As shown in FIG. 1, the networking system 100 may include a plurality of distinct tiers of functional components, including a data source tier 102, a portal tier 104, and a client tier 106.

The data source tier 102 preferably comprises one or more diagnostic modules 108, which may generate statistics, for example, as discussed below. In one embodiment, a diagnostic module 108 may comprise one or more hardware modules, one or more software modules, other suitable modules, or any combination thereof.

The client tier 106 preferably comprises software-implemented clients that may provide visualizations of the statistics generated by the diagnostic modules 108. In addition, the client tier 106 may be used to configure the function of the portal tier 104. Examples of systems and methods for a plurality of distinct tiers of functional components include, but are not limited to, those described in U.S. patent application Ser. No. 10/307,272, entitled A SYSTEM AND METHOD FOR NETWORK TRAFFIC AND I/O TRANSACTION MONITORING OF A HIGH SPEED COMMUNICATIONS NETWORK and filed Nov. 27, 2002, now U.S. Pat. No. 7,599,293, which issued on Oct. 6, 2009, which is hereby incorporated by reference herein in its entirety. It will be appreciated that the networking system 100 does not require a plurality of distinct tiers of functional components and that the networking system 100 does not require a data source tier, a portal tier, or a client tier.

The client tier 106 preferably comprises software-implemented clients that may provide visualizations of the statistics generated by the diagnostic modules 108. In addition, the client tier 106 may be used to configure the function of the portal tier 104. Examples of systems and methods for a plurality of distinct tiers of functional components include, but are not limited to, those described in U.S. patent application Ser. No. 10/307,272, entitled A SYSTEM AND METHOD FOR NETWORK TRAFFIC AND I/O TRANSACTION MONITORING OF A HIGH SPEED COMMUNICATIONS NETWORK and filed Nov. 27, 2002, which is hereby incorporated by reference herein in its entirety. It will be appreciated that the networking system 100 does not require a plurality of distinct tiers of functional components and that the networking system 100 does not require a data source tier, a portal tier, or a client tier.

The networking system 100 may include one or more nodes, which may communicate via, for example, links 110. As used herein, a "node" includes, but is not limited to, a server or host; a client or storage device; a switch; a hub; a router; all or a portion of a SAN fabric; a diagnostic device; and any device that may be coupled to a network and that may receive and/or monitor a signal or data over at least a portion of a network, that may send and/or generate a signal or data over at least a portion of a network, or both.

In one embodiment, a signal (such as, an electrical signal, an optical signal, and the like) may be used to send and/or receive network messages over at least a portion of a network. As used herein, a "network message" includes, but is not limited to, a packet; a datagram; a frame; a data frame; a command frame; an ordered set; any unit of data capable of being routed (or otherwise transmitted) through a computer network; and the like. In one embodiment, a network message may comprise transmission characters used for data purposes, protocol management purposes, code violation errors, and the like. Also, an ordered set may include, a Start of Frame ("SOF"), an End of Frame ("EOF"), an Idle, a Receiver-Ready ("R_RDY"), a Loop Initialization Primitive ("LIP"), an Arbitrate ("ARB"), an Open ("OPN"), and Close ("CLS")—such as, those used in certain embodiments of Fibre Channel. Of course, any ordered sets and/or any network messages of any other size, type, and/or configuration may be used, including, but not limited to, those from any other suitable protocols.

Nodes may communicate using suitable network protocols, including, but not limited to, serial protocols, physical layer protocols, channel protocols, packet-switching protocols, circuit-switching protocols, Ethernet, Fast Ethernet, Gigabit Ethernet, 10 Gigabit Ethernet, Fibre Channel, Fibre Channel Arbitrated Loop ("FC-AL"), Small Computer System Interface ("SCSI"), High Performance Parallel Interface ("HIPPI"), Serial Attached SCSI ("SAS"), Serial ATA ("SATA"), SAS/SATA, Serial SCSI Architecture ("SSA"), and the like.

Exemplary Access of Links

A diagnostic module 108 may be connected to and/or access one or more links 110. The diagnostic module 108 can perform one or more network diagnostic functions using the data that is transmitted over the links 110. For example, as described in more detail below, the diagnostic module 108 can generate network diagnostic statistics using the data transmitted on the links 110.

Figure 2:
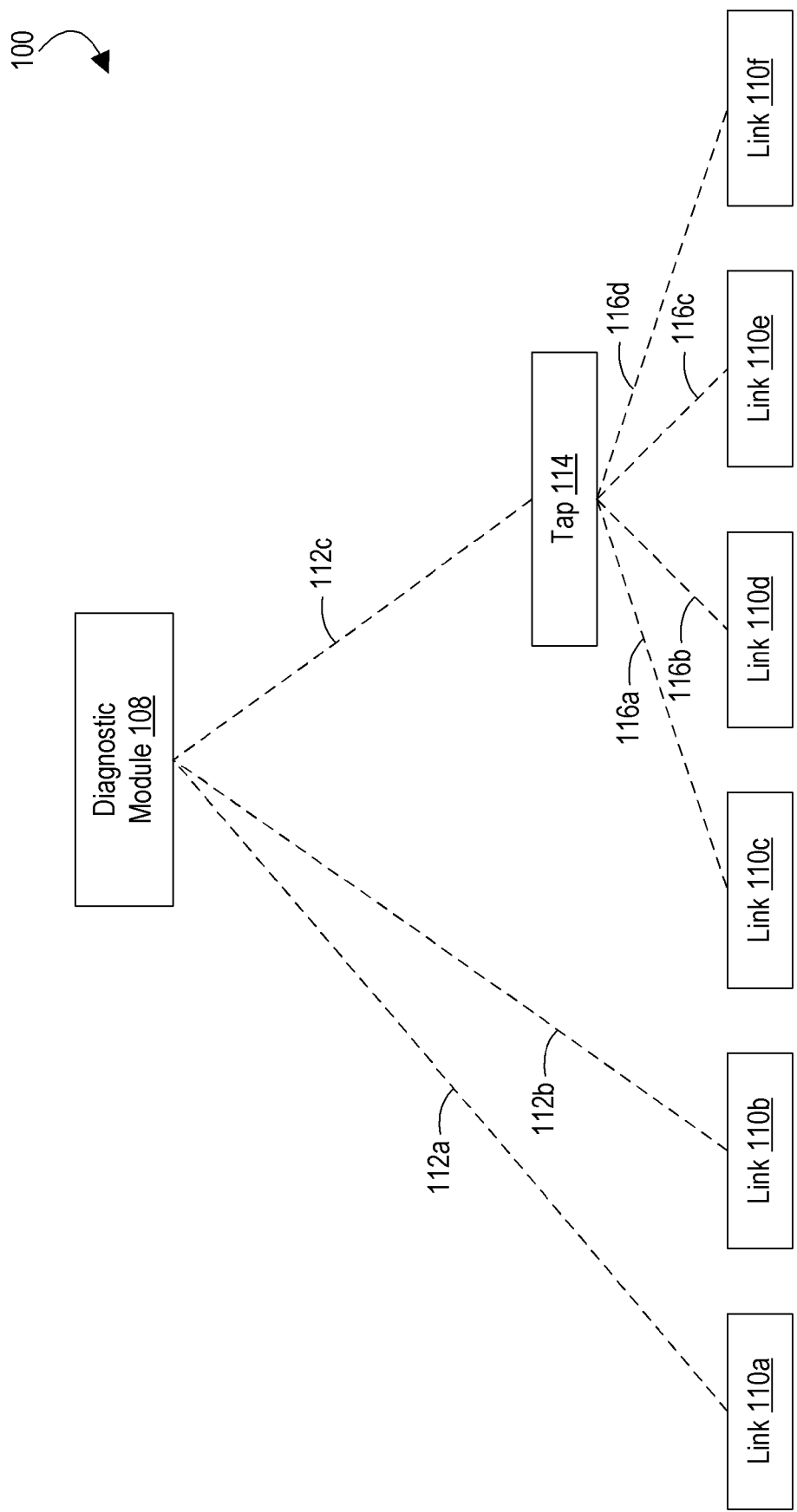
FIG. 2 is a block diagram of an exemplary embodiment of the networking system shown in FIG. 1.

As shown in FIG. 2, a diagnostic module 108 may access links 110 via connections 112. For example, the diagnostic module 108 may be connected to the link 110a via the connection 112a, to the link 110b via the connection 112b, or to any one of the links 110c, 110d, 110e, 110f via the connection 112c and a tap 114.

A diagnostic module 108 may be disconnected from one link 110 and connected to another link 110, which may allow the diagnostic module 108 to access multiple links 110. For example, the diagnostic module 108 may be disconnected from a first cable (not shown) providing the connection 112a in order to disconnect the diagnostic module 108 from the link 110a, and the diagnostic module 108 may be connected to a second cable (not shown) providing the connection 112b in order to connect the diagnostic module 108 to the link 110b. Also, for example, while the diagnostic module 108 accesses the tap 114 via the connection 112c, the tap 114 may switch from the connection 116a to the connection 116b in order to disconnect the diagnostic module 108 from the link 110c and connect the diagnostic module 108 to the link 110d.

Exemplary Method

In some cases, some or all of the links 110 may transmit data at different data transmission rates.

Figure 7:
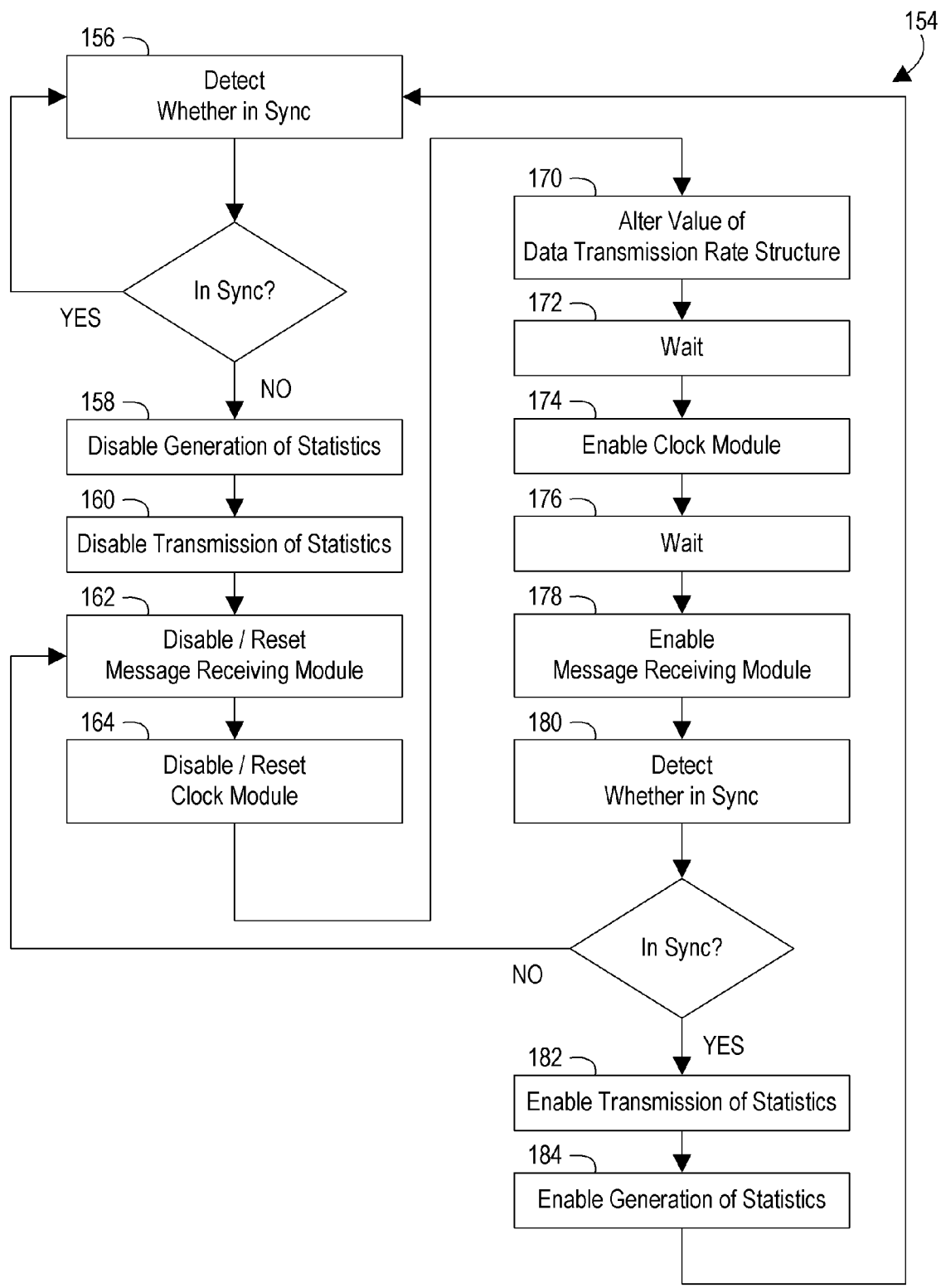
FIG. 7 is a flowchart illustrating an exemplary embodiment of a method.

In one embodiment, when the diagnostic module 108 is connected to a first link 110 transmitting data at a first data transmission rate, the diagnostic module 108 may automatically apply the first data transmission rate by, for example, performing all or a a portion of a method 118 (FIG. 3) and/or all or a portion of a method 154 (FIG. 7). In one embodiment, when the diagnostic module 108 is disconnected from a first link 110 transmitting data at a first data transmission rate and connected to a second link 110 transmitting data at a different second data transmission rate, the diagnostic module 108 may automatically apply the different second data transmission rate by, for example, performing all or a portion of a method 118 (FIG. 3) and/or all or a portion of a method 154 (FIG. 7). In some instances, the first and second data transmission rates may differ because they are different rates from the same protocol (for example, slower or faster rates of Fibre Channel) or because they are different rates from different protocols (for example, the first link may transmit data using Fibre Channel while the second link may transmit data using Ethernet). Thus, the diagnostic module 108 may advantageously be configured to handle multiple data transmission rates from the same protocol and/or different protocols. For example, in some embodiments, the diagnostic module 108 may be configured to handle Fibre Channel [1.0625 Gigabits/second; 2.125 Gigabits/second; 4.25 Gigabits/second; 8.5 Gigabits/second; (1.0625 Gigabits/second)*a where a is any integer greater than 0; and/or other data transmission rates], Gigabit Ethernet [1.25 Gigabits/second; 2.5 Gigabits/second; (1.25 Gigabits/second)*b where b is any integer greater than 0; and/or other data transmission rates], SAS/SATA [1.5 Gigabits/second; 3.0 Gigabits/second; 6.0 Gigabits/second; 12.0 Gigabits/second; (1.5 Gigabits/second)*c where c is any integer greater than 0; and/or other data transmission rates], other protocols and/or data transmission rates; or any combination thereof.

In further detail, the method 118 may be performed by the system 100; a diagnostic module 108; one or more other suitable components, systems, modules, and the like; or any combination thereof. Of course, the entire method 118 need not be performed; and any part or parts of the method 118 may be performed to provide a useful method 118.

Figure 3:
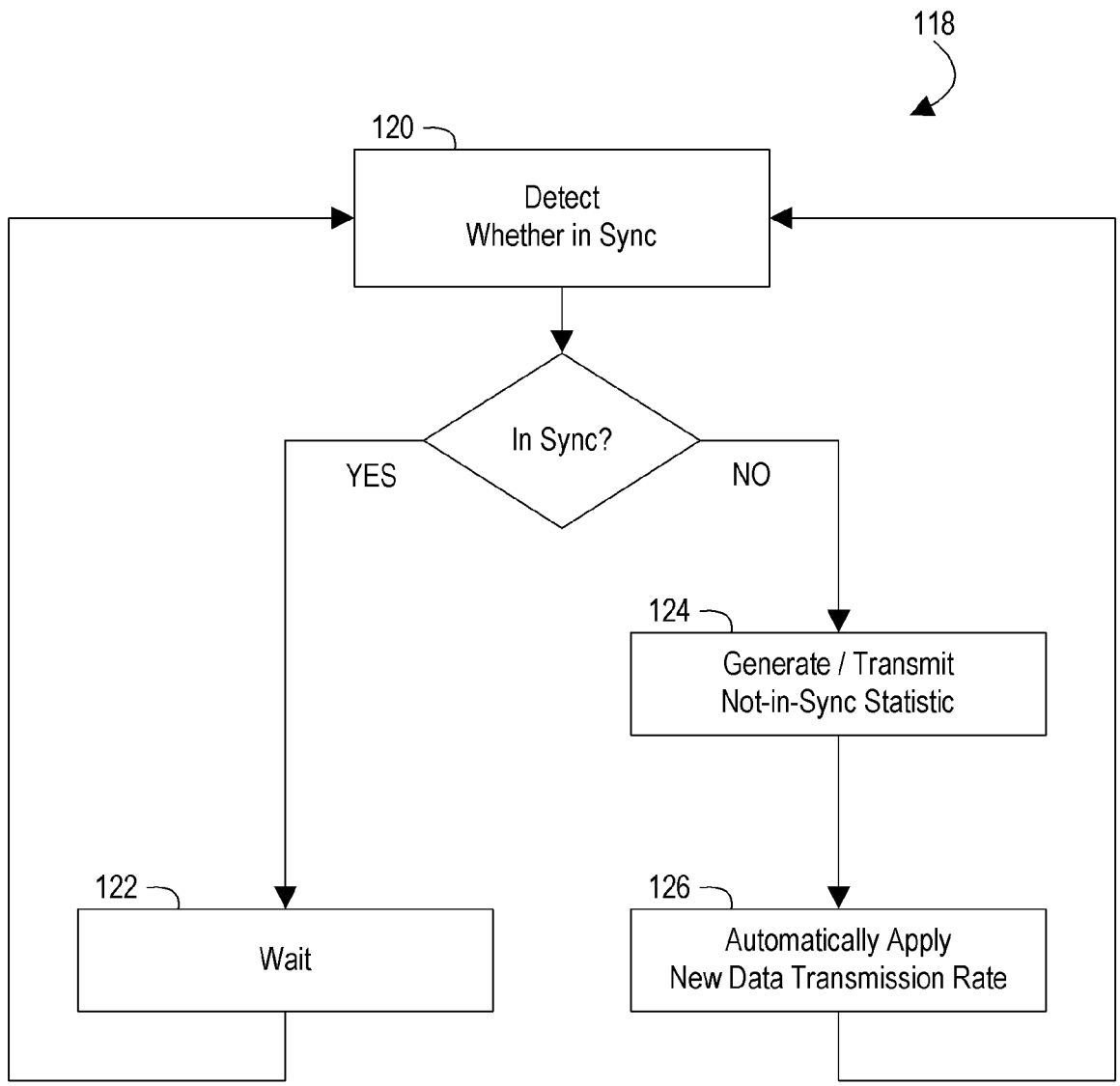
FIG. 3 is a flowchart illustrating an exemplary embodiment of a method.

As shown in FIG. 3, at a block 120, the diagnostic module 108 may detect whether the diagnostic module 108 is in sync with the data transmission rate of the link 110 from which the diagnostic module 108 receives data. In one embodiment, to detect whether the diagnostic module 108 is in sync with the data transmission rate of a link 110 from which the diagnostic module 108 receives data, the diagnostic module 108 may detect one or more errors associated with the link 110, such as, when a signal on the link is lost or when the data transmitted on the link, as interpreted by the diagnostic module 108, contains one or more errors (e.g. one or more of a particular type of error, a combination of two or more particular types of errors, etc.). For example, when the diagnostic module 108 is disconnected from a first link 110 transmitting data at a first data transmission rate, the diagnostic module 108 may lose the signal on the first link 110, which the diagnostic module 108 may detect as an error. In addition, when the diagnostic module 108 is then connected to a second link 110 transmitting data at a different second data transmission rate, the data that the diagnostic module 108 receives from the second link 110, as interpreted by the diagnostic module 108, contains at least one error because the diagnostic module 108 initially interprets that data using the first data transmission rate instead of the second data transmission rate.

If, at the block 120, the diagnostic module 108 is in sync with the data transmission rate of the link 110 from which it receives data, the diagnostic module 108 may proceed to a block 122 to wait for an amount of time before returning to the block 120. The diagnostic module 108 preferably waits, at the block 122, for a predetermined amount of time. Consequently, the diagnostic module 108 may be configured to periodically detect whether the diagnostic module 108 is in sync with the link's data transmission rate according to a predetermined period, such as, between 95 to 105 milliseconds; at least 95 milliseconds; between 90 to 110 milliseconds; at least 90 milliseconds; between 80 to 120 milliseconds; at least 80 milliseconds; between 70 to 130 milliseconds; at least 70 milliseconds; between 60 to 140 milliseconds; at least 60 milliseconds; between 60 to 140 milliseconds; at least 60 milliseconds; between 50 to 150 milliseconds; at least 50 milliseconds; at least 40 milliseconds; at least 30 milliseconds; at least 20 milliseconds; at least 10 milliseconds; at least 5 milliseconds; at least 1 millisecond; between 950 to 1,050 microseconds; at least 950 microseconds; between 900 to 1,100 microseconds; at least 900 microseconds; between 800 to 1,200 microseconds; at least 800 microseconds; between 700 to 1,300 microseconds; at least 700 microseconds; between 600 to 1,400 microseconds; at least 600 microseconds; between 600 to 1,400 microseconds; at least 600 microseconds; between 500 to 1,500 microseconds; at least 500 microseconds; at least 400 microseconds; at least 300 microseconds; at least 200 microseconds; at least 100 microseconds; at least 50 microseconds; at least 40 microseconds; at least 30 microseconds; at least 20 microseconds; at least 10 microseconds; at least 1 microsecond; and/or any other suitable period of time. Preferably, the predetermined period may be sufficiently long that, if an error associated with the link 110 is detected at the block 120, the error most likely occurred because the diagnostic module 108 is not in sync with the link's data transmission rate. This may advantageously allow the diagnostic module 108 to ignore routine, sufficiently brief errors that are likely unrelated to whether or not the diagnostic module 108 is in sync with the link's data transmission rate.

If, at the block 120, the diagnostic module 108 is not in sync with the data transmission rate of the link 110 from which it receives data, the diagnostic module 108 may, at a block 124, generate a statistic indicating that the diagnostic module is not in sync with the data transmission rate of the link 110 from which it receives data. Also, at the block 124, the diagnostic module 108 may transmit the generated statistic to, for example, the portal tier 104 (FIG. 1). It will be appreciated, however, that the diagnostic module 108 need not generate or transmit the statistic indicating that the diagnostic module is not in sync with the link's data transmission rate and that the block 124 is not required.

In addition, if, at the block 120, the diagnostic module 108 is not in sync with the data transmission rate of the link 110 from which it receives data, the diagnostic module 108 may, at a block 126, automatically apply a new data transmission rate and return to the block 120.

If (when the diagnostic module 108 returns to the block 120) the diagnostic module 108 is in sync with the link's data transmission rate, the diagnostic module 108 may proceed to the block 122. If (when the diagnostic module 108 returns to the block 120) the diagnostic module 108 is not in sync with the link's data transmission rate, the diagnostic module 108 may, at the block 126, automatically apply another new data transmission rate and return again to the block 120.

If (when the diagnostic module 108 returns again to the block 120) the diagnostic module 108 is in sync with the link's data transmission rate, the diagnostic module 108 may proceed to the block 122. If (when the diagnostic module 108 returns again to the block 120) the diagnostic module 108 is still not in sync with the link's data transmission rate, the diagnostic module 108 may, at the block 126, automatically apply yet another new data transmission rate and return yet another time to the block 120.

Desirably, the diagnostic module 108 may be configured to repeatedly return to the block 126 and apply two, three, four or more different data transmission rates until, for example, the diagnostic module 108 returns to the block 120 and detects that the diagnostic module 108 is in sync with the link's data transmission rate. In some instances, the applied transmission rates may differ because they are different rates from the same protocol (for example, slower or faster rates of Fibre Channel) or because they are different rates from different protocols (for example, the first link may transmit data using Fibre Channel while the second link may transmit data using Ethernet). Thus, the diagnostic module 108 may advantageously be configured to handle multiple data transmission rates from the same protocol and/or different protocols. For example, in some embodiments, the diagnostic module 108 may be configured to handle Fibre Channel [1.0625 Gigabits/second; 2.125 Gigabits/second; 4.25 Gigabits/second; 8.5 Gigabits/second; (1.0625 Gigabits/second)*a where a is any integer greater than 0; and/or other data transmission rates], Gigabit Ethernet [1.25 Gigabits/second; 2.5 Gigabits/second; (1.25 Gigabits/second)*b where b is any integer greater than 0; and/or other data transmission rates], SAS/SATA [1.5 Gigabits/second; 3.0 Gigabits/second; 6.0 Gigabits/second; 12.0 Gigabits/second; (1.5 Gigabits/second)*c where c is any integer greater than 0; and/or other data transmission rates], other protocols and/or data transmission rates; or any combination thereof.

Exemplary Architecture

Figure 4:
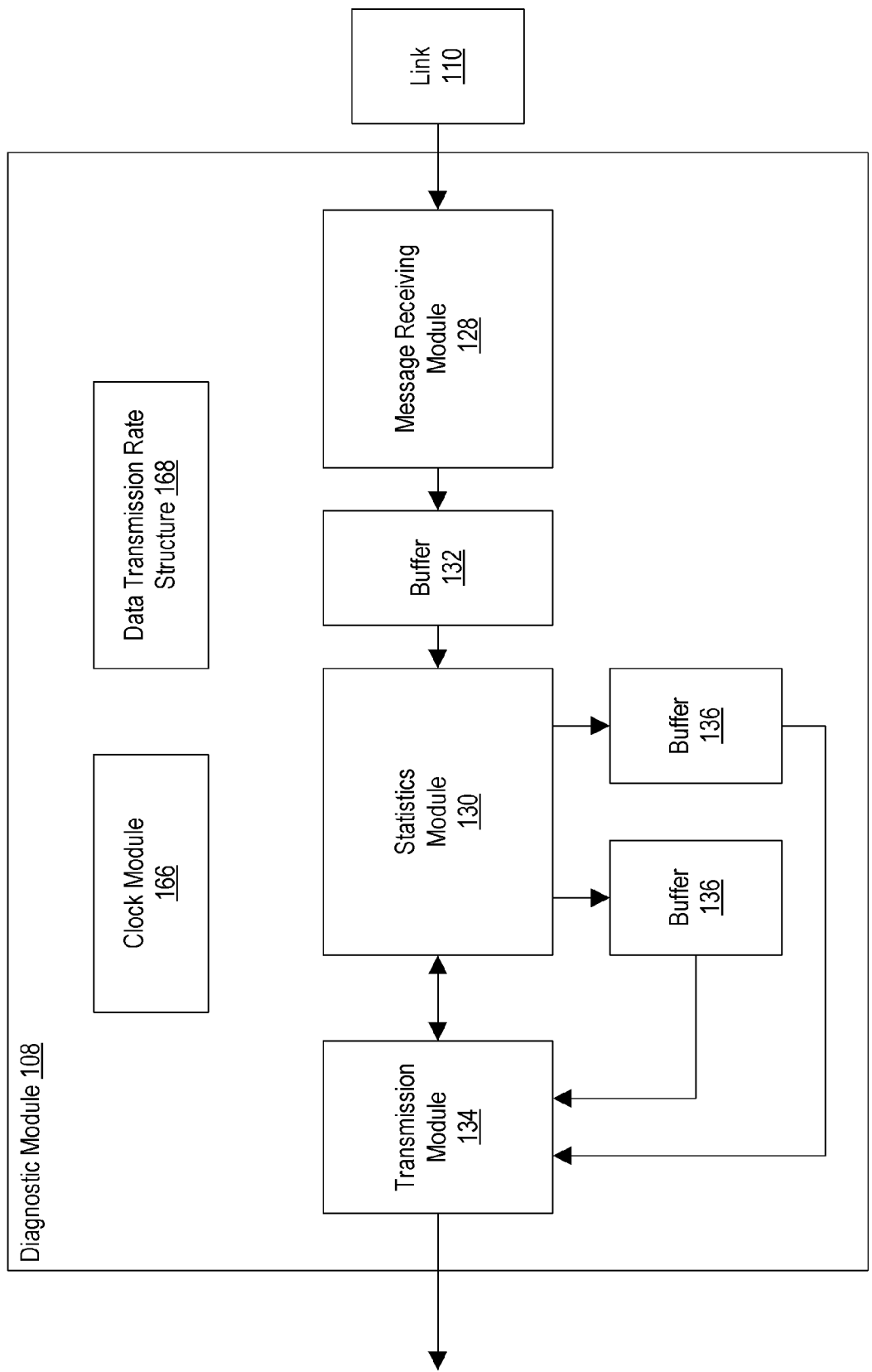
FIG. 4 is a block diagram of an exemplary embodiment of a diagnostic module.

As shown in FIG. 4, the diagnostic module 108 may include a message receiving module 128. The message receiving module 128 may be configured to receive signals from one or more communication paths, such as a communication path provided by a link 110. Accordingly, the message receiving module 128 may receive one or more network messages from the communication paths and, as discussed in further detail below, may process those network messages.

The diagnostic module 108 may also include a statistics module 130. The statistics module 130 may receive the processed (or unprocessed) messages from the message receiving module 128 and may generate one or more statistics using the messages. In further detail, the diagnostic module 108 may include one or more buffers 132, which may be stored in any suitable storage devices. The message receiving module 128 may store the network messages it receives and/or processes in the buffer 132; and the statistics module 130 may retrieve the messages from the buffer 132 and generate one or more statistics using the retrieved messages.

The diagnostic module 108 may also include a transmission module 134, which may receive the statistics generated by the statistics module 130 and may help transmit the statistics to, for example, the portal tier 104 (FIG. 1). In further detail, the diagnostic module 108 may include one or more buffers 136, which may be stored in any suitable storage devices. The statistics module 130 may store the statistics it generates in the buffers 136; and the transmission module 130 may retrieve the messages from the buffers 136 and help transmit the statistics to the portal tier 104. In one embodiment, the transmission module 130 may communicate with a CPU module (for example, CPU modules 188, 196, 200 discussed below) that transmits the statistics to the portal tier 104.

Exemplary Method

Figure 5:
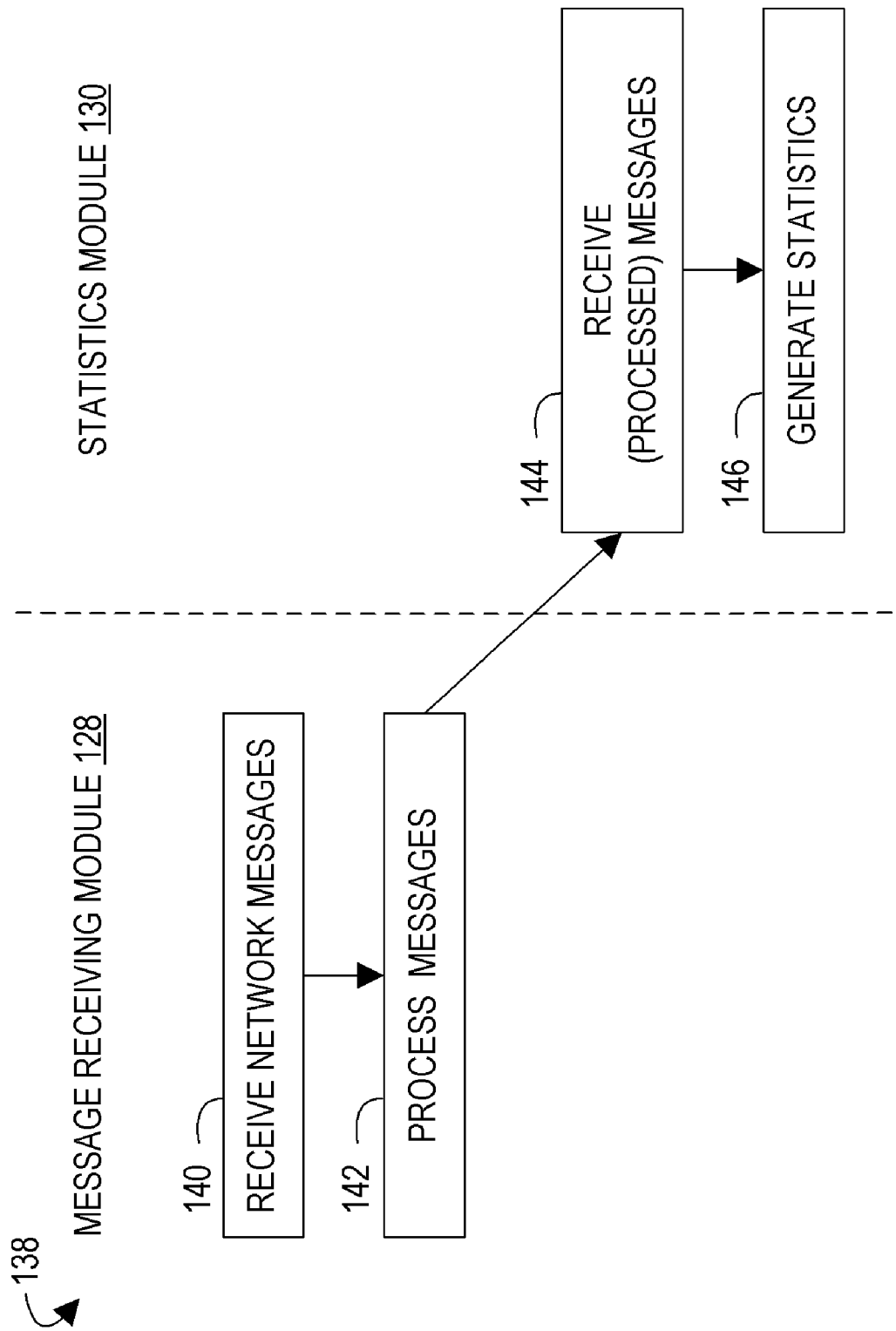
FIG. 5 is a flowchart illustrating an exemplary embodiment of a method.

As shown in FIG. 5, a method 138 may be performed by the system 100; a diagnostic module 108; a message receiving module 128; a statistics module 130; one or more other suitable components, systems, modules, and the like; or any combination thereof. Of course, the entire method 138 need not be performed; and any part or parts of the method 138 may be performed to provide a useful method 138.

Referring to FIGS. 4 and 5, at a block 140, the message receiving module 128 may receive network messages from one or more communication paths. At a block 142, the message receiving module 128 may process the received network messages into one or more messages having an alternative, substitute, different, or otherwise alternate format or structure adapted to be used by the statistics module 130 to perform one or more network diagnostic functions, such as generate network diagnostic statistics. It will be appreciated, however, that the message receiving module 128 need not process the received network messages into one or more messages having an alternative, substitute, different, or otherwise alternate format or structure and that the block 142 is not required.

As shown in FIG. 5, the statistics module 130 may receive the processed (or unprocessed) messages at a block 144. At a block 146, the statistics module 130 may generate one or more statistics using the messages that were received at the block 144. For example, at the block 146, the statistics module 130 may count the number of physical errors (such as, bit transmission errors, CRC error, and the like), protocol errors (such as, timeouts, missing network messages, retries, out of orders), protocol events (such as, an abort, a buffer is full message), and the like. Also, as an example, at the block 146, the statistics module 130 may create conversation specific statistics, such as, the number of packets exchanged in a conversation, the response times associated with the packets exchanged in a conversation, and the like. Of course, the statistics modules 130 may generate any of a variety of other suitable statistics at the block 146.

Figure 6:
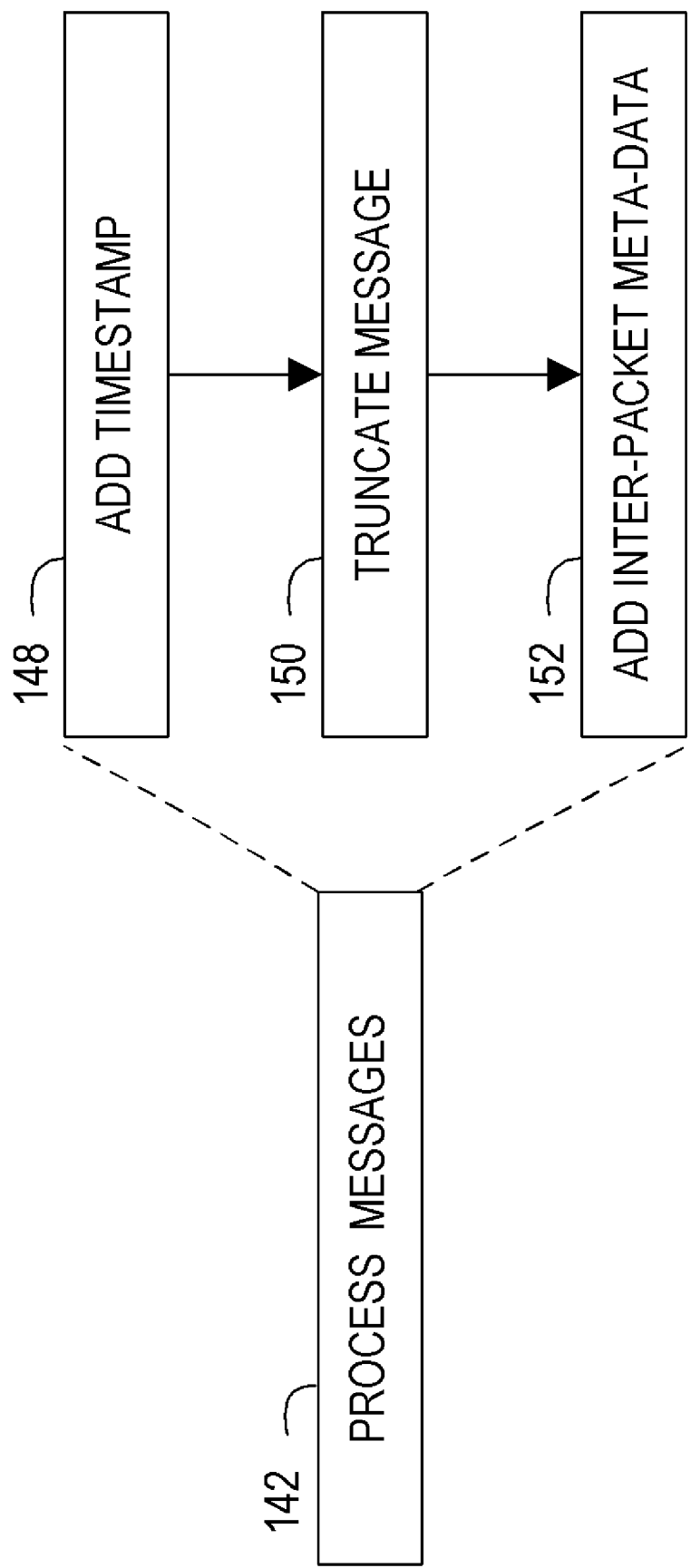
FIG. 6 is a flowchart illustrating an exemplary embodiment of a method.

FIG. 6 is a block diagram illustrating an exemplary embodiment of how a message receiving module 128 may process received network messages at the block 142 (FIG. 5). In particular, as shown in FIG. 6, the block 142 may include one or more blocks, such as blocks 148, 150, 152. It will be appreciated, however, that the block 142 does not require any of the blocks 148, 150, 152.

The received network messages may have a first format adapted to comply with at least one network protocol supported by the networking system 100. In processing the network messages at the block 142, the message receiving module 128 may process a set of one or more received messages into a set of one or more messages having an alternative, substitute, different, or otherwise alternate format or structure. Thus, the set of one or more messages having an alternative, substitute, different, or otherwise alternate format or structure may be derived from the set of one or more received messages.

For example, at the block 148, the message receiving module 128 may generate and add a timestamp to the network message. The timestamp may indicate when the message receiving module 128 received at least a portion of the network message or any other suitable time.

At the block 150, the message receiving module 128 may truncate at least a portion of the received network message. For example, in some embodiments, the network message may include a header portion, a payload or other data portion, and/or other portions. The message receiving module 128 may discard or otherwise remove some or at least a portion of the data portion—thus truncating the network message. In some embodiments, the message receiving module 128 may be configured to detect the type of network message and dynamically determine which, if any, portions of a network message may be removed. For example, the message receiving module 128 may be configured to detect that a network message includes a nested or layered message within the network message's data portion—thus allowing the message receiving module 128 to retain any desired portions of the nested message and remove any other portions.

At the block 152, the message receiving module 128 may add (to the received network message) meta-data adapted to describe at least a portion of the network messages that occurred between the received network message and another network message. For example, a received network message may comprise a packet, a frame, or the like that is received after an earlier network message that comprised a packet, a frame, or the like. In this example, the meta-data may comprise, for instance, data describing the number and/or types of ordered sets that were received between the earlier network message and the received network message.

As shown above, a message receiving module 128 may, at the block 142, process the received network messages into one or more messages having an alternative, substitute, different, or otherwise alternate format or structure adapted to be used by the statistics module 130 to perform one or more network diagnostic functions. The alternate format messages may include any suitable combination of: a timestamp, at least a portion of a network message (which may or may not be truncated), inter-packet meta-data, any other suitable data that may be useful for the statistics module 130, or any combination thereof. In one embodiment, an alternate format message may also include one or more delimiters adapted to indicate the start and end of the alternate format message and/or processing meta-data adapted to describe how the received network message was truncated or otherwise processed by the message receiving module 128. Accordingly, the statistics module 130 may advantageously use the timestamp, any portion of a received network message, the inter-packet meta-data, the delimiter, the processing-meta data, and/or any other data provided by the alternate format messages to determine how to perform various diagnostic functions.

Exemplary Method

As shown in FIG. 7, a method 154 may be performed by the system 100; a diagnostic module 108; a message receiving module 128; a statistics module 130; one or more other suitable components, systems, modules, and the like; or any combination thereof. Of course, the entire method 154 need not be performed; and any part or parts of the method 154 may be performed to provide a useful method 154.

As mentioned above, the message receiving module 128 may be configured to receive signals from one or more communication paths, such as a communication path provided by a link 110. As shown in FIG. 7, at a block 156, the message receiving module 128 may detect whether the message receiving module 128 is in sync with the data transmission rate of the link 110 from which the message receiving module 128 receives data. In one embodiment, to detect whether the message receiving module 128 is in sync with the data transmission rate of a link 110 from which the message receiving module 128 receives data, the message receiving module 128 may detect one or more errors associated with the link 110, such as, when a signal on the link is lost or when the data transmitted on the link, as interpreted by the message receiving module 128, contains one or more errors (e.g. one or more of a particular type of error, a combination of two or more particular types of errors, etc.). For example, when the message receiving module 128 is disconnected from a first link 110 transmitting data at a first data transmission rate, the message receiving module 128 may lose the signal on the first link 110, which the message receiving module 128 may detect as an error. In addition, when the message receiving module 128 is then connected to a second link 110 transmitting data at a different second data transmission rate, the data that the message receiving module 128 receives from the second link 110, as interpreted by the message receiving module 128, contains at least one error because the message receiving module 128 initially interprets that data using the first data transmission rate instead of the second data transmission rate.

If, at the block 156, the message receiving module 128 is in sync with the data transmission rate of the link 110 from which it receives data, the message receiving module 128 may optionally wait for a predetermined amount of time (for example, as described in detail above with reference to block 122 in FIG. 3) and may return to the block 156.

If, at the block 156, the message receiving module 128 is not in sync with the data transmission rate of the link 110 from which it receives data, the diagnostic module 108 may disable the generation of statistics by the statistics module 130 at a block 158, may disable the transmission of such statistics by the transmission module 134 at a block 160, and may disable and/or reset the message receiving module 128 at a block 162.

At a block 164, the diagnostic module 108 may disable and/or reset a clock module 166 (FIG. 4). In further detail, as shown in FIG. 4, the diagnostic module 108 may include the clock module 166. The clock module 166 may be configured to provide one or more clock signals to, for example, the message receiving module 128. For instance, the clock module 166 may be configured to provide a clock signal having any of a variety of different frequencies corresponding to the variety of data transmission rates of the links 110 from which the message receiving module 128 could receive data. The diagnostic module 108 may also include a data transmission rate structure 168, which may include a value indicating the frequency of the signal that the clock module 166 is to provide to the message receiving module 128.

At a block 170, the diagnostic module 108 may alter the value of the data transmission rate structure 168 from a first value indicating a first data transmission rate to a second value indicating a different second data transmission rate. After altering the value of the data transmission rate structure 168 at the block 170, the diagnostic module 108 may, at the block 172, wait a predetermined amount of time (such as, about 50 milliseconds) to help ensure the altered value will be available for the clock module 166. It will be appreciated that the diagnostic module 108 may wait a longer or shorter amount of time depending, for example, upon the particular configuration of the diagnostic module 108, the clock module 166, and/or the data transmission rate structure 168.

At a block 174, the diagnostic module 108 may enable the clock module 166, which may access the data transmission rate structure 168 and commence providing (to the message receiving module 128) a signal having the frequency indicated by altered value of the data transmission rate structure 168. After enabling the clock module 166 at the block 174, the diagnostic module 108 may, at the block 176, wait a predetermined amount of time (such as, about 50 milliseconds) to help ensure this signal stabilizes. It will be appreciated that the diagnostic module 108 may wait a longer or shorter amount of time depending, for example, upon the particular configuration of the diagnostic module 108, the clock module 166, and/or the message receiving module 128.

At a block 178, the diagnostic module 108 may enable the message receiving module 128, which may commence receiving data from the link 110. At the block 180, the message receiving module 128 may detect whether the message receiving module 128 is in sync with the data transmission rate of the link 110 from which the message receiving module 128 receives data (for example, as described in detail above with reference to block 156).

If, at the block 180, the message receiving module 128 is not in sync with the data transmission rate of the link 110 from which it receives data, the diagnostic module 108 may return to the block 162 to perform blocks 162 through 180. When performing the block 170, the diagnostic module 108 may advantageously alter the value of the data transmission rate structure 168 from the second value indicating a second data transmission rate to a third value indicating a different third data transmission rate.

If, at the block 180, the message receiving module 128 is in sync with the data transmission rate of the link 110 from which it receives data, the diagnostic module 108 may enable the transmission of statistics by the transmission module 134 at a block 182 and may enable the generation of such statistics by the statistics module 130 at a block 184.

Exemplary Networking Systems

It will be appreciated that the diagnostic module 108 may be used to implement a variety of networking systems, networking diagnostic systems, and the like. FIGS. 8A-8D illustrate various embodiments of the networking system 100 shown in FIG. 1.

Figure 8A:
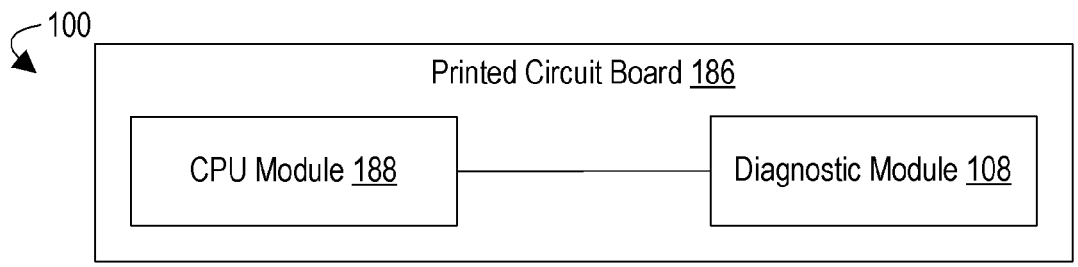
FIG. 8A is a block diagram of an exemplary embodiment of the networking system shown in FIG. 1.

As shown in FIG. 8A, the networking system 100 may include a printed circuit board 186, which may include a CPU module 188 and the diagnostic module 108. The diagnostic module 108 may be coupled to the CPU module 188 using any suitable interface. The printed circuit board 186 may include one or more CPU modules and may include one or more diagnostic modules, depending upon the particular configuration.

Figure 8B:
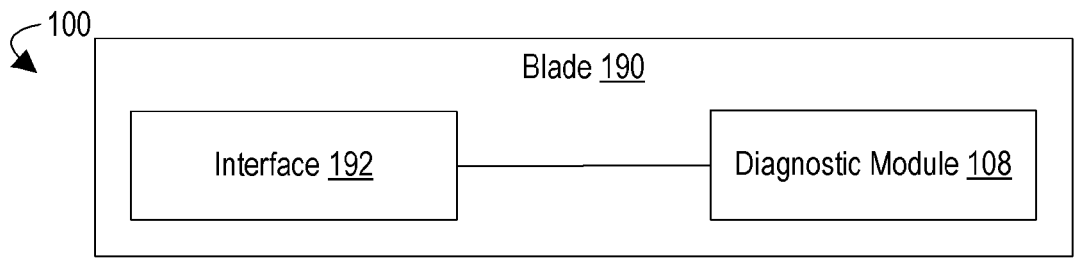
FIG. 8B is a block diagram of an exemplary embodiment of the networking system shown in FIG. 1.

As shown in FIG. 8B, the networking system 100 may include a blade 190, which may comprise a printed circuit board. The blade 190 may include an interface 192 and the diagnostic module 108. The diagnostic module 108 may be coupled to the interface 192.

Figure 8C:
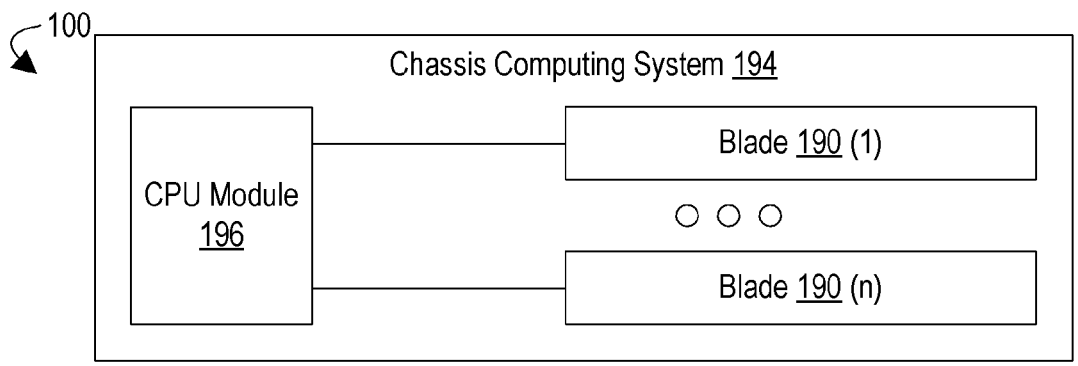
FIG. 8C is a block diagram of an exemplary embodiment of the networking system shown in FIG. 1.

As shown in FIG. 8C, a chassis computing system 194 may include one or more CPU modules (such as, a CPU module 196), which may be adapted to interface with one, two, or more blades or other printed circuit boards. For example, a blade may have an interface (such as, the interface 192) though which the diagnostic module 108 may send network diagnostic statistics to the CPU module. The chassis computer system 194 may be adapted to receive one or more printed circuit boards or blades.

A CPU module, such as, the CPU modules 188 and 196, may transmit the network diagnostic statistics it receives to a local storage device, a remote storage device, or any other suitable system for retrieval and/or further analysis of the statistics. A client software program may retrieve, access, and/or manipulate the statistics for any suitable purpose. Examples of systems and methods for storing and retrieving network diagnostic statistics include, but are not limited to, those described in U.S. patent application Ser. No. 10/307,272, entitled A SYSTEM AND METHOD FOR NETWORK TRAFFIC AND I/O TRANSACTION MONITORING OF A HIGH SPEED COMMUNICATIONS NETWORK and filed Nov. 27, 2002, which is hereby incorporated by reference herein in its entirety.

Figure 8D:
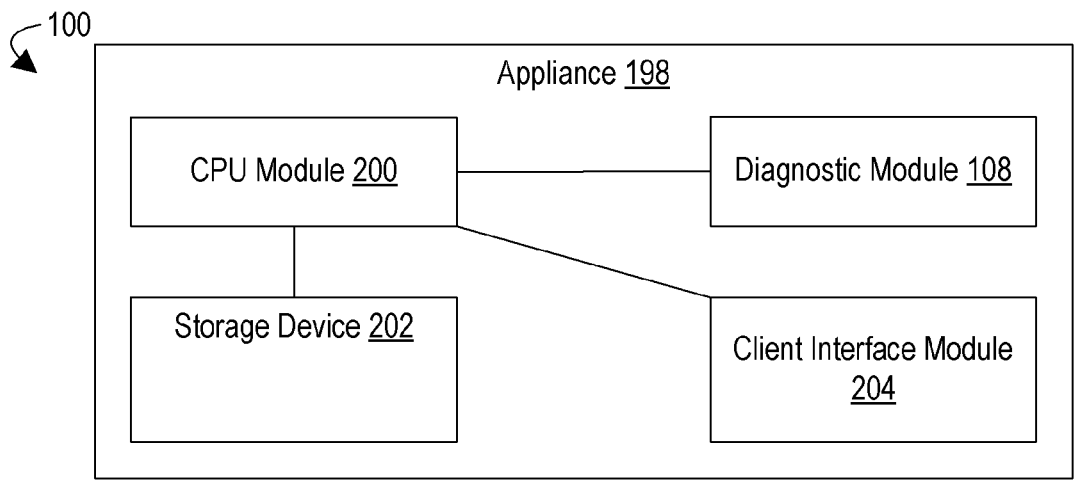
FIG. 8D is a block diagram of an exemplary embodiment of the networking system shown in FIG. 1.

As shown in FIG. 8D, an appliance (such as, an appliance 198) may comprise one or more diagnostic modules (such as, the diagnostic module 108). Depending on the particular configuration, the appliance 198 may include any suitable combination of one or more CPU modules (such as, a CPU module 200) and one or more diagnostic modules. In one embodiment, an appliance may include and/or be in communication with one or more storage devices (such as, a storage device 202), which may advantageously be used for storing any suitable diagnostic data, statistics, and the like. In one embodiment, an appliance may include and/or be in communication with one or more client interface modules (such as, a client interface module 204), which may advantageously be used for displaying information to a user, receiving user input from a client software program, sending information to a client software program, or both. The appliance may also include and/or be in communication with one or more display devices adapted to display information, one or more user input devices (such as, a keyboard, a mouse, a touch screen, and the like) adapted to receive user input, or both.

Exemplary Ethernet LAN Statistics

As described above, a diagnostic module 108 and/or a statistics module 130 may generate a variety of statistics. In some embodiments, statistics may be generated for Ethernet LANs or other networks.

In one embodiment, the Ethernet LAN statistics may include protocol distribution statistics, which may include any combination of the following: the number of packets for a protocol, the percent of all packets which were this protocol, the number of octets (bytes) for this protocol, the percent of all bytes which were this protocol, the percent of the theoretical bandwidth used by this protocol, and/or other like statistics.

In one embodiment, the Ethernet LAN statistics may include a variety of host-specific stats, which may include any combination of the following: the number of frames destined for the host, the number of frames from the host, the number of frames to and from the host, the number of bytes destined for the host, the number of bytes from the host, the number of bytes to and from the host, the number of errors from the host, the number of broadcast frames from the host, the number of multicast frames from the host, the percent of all frames that are destined for the host, the percent of all frames that are from the host, the percent of all frames that are to or from the host, the percent of all bytes that are destined for the host, the percent of all bytes that are from the host, the percent of all bytes that are to or from the host, the percent of the theoretical bandwidth used by traffic destined for the host, the percent of the theoretical bandwidth used by traffic from the host, the percent of the theoretical bandwidth used by traffic to and from the host, the average size in bytes for frames that are destined for the host, the average size in bytes for frames that are from the host, the average size in bytes for all frames to or from the host, and/or other like statistics.

In one embodiment, the Ethernet LAN statistics may include a variety of host-specific, network-layer statistics, such as, for a particular virtual LAN. The host-specific, network-layer statistics may include any combination of: the number of frames in the number of frames out, the number of frames in and out, the number of bytes in, the number of bytes out, the number of bytes in and out, the number of non-unicast frames, the percent of all frames that are destined for the host, the percent of all frames that are from the host, the percent of all frames that are to or from the host, the percent of all bytes that are destined for the host, the percent of all bytes that are from the host, the percent of all bytes that are to or from the host, the percent of the theoretical bandwidth used by traffic destined for the host, the percent of the theoretical bandwidth used by traffic from the host, the percent of the theoretical bandwidth used by traffic to and from the host, the average size in bytes for frames that are destined for the host, the average size in bytes for frames that are from the host, the average size in bytes for all frames to or from the host, and/or other like statistics.

In one embodiment, the Ethernet LAN statistics may include a variety of host-specific, application-layer statistics, such as, for a particular virtual LAN identifier and application protocol. The host-specific, application-layer statistics may include any combination of: the number of frames in the number of frames out, the number of frames in and out, the number of bytes in, the number of bytes out, the number of bytes in and out, the percent of all frames that are destined for the host, the percent of all frames that are from the host, the percent of all frames that are to or from the host, the percent of all bytes that are destined for the host, the percent of all bytes that are from the host, the percent of all bytes that are to or from the host, the percent of the theoretical bandwidth used by traffic destined for the host, the percent of the theoretical bandwidth used by traffic from the host, the percent of the theoretical bandwidth used by traffic to and from the host, the average size in bytes for frames that are destined for the host, the average size in bytes for frames that are from the host, the average size in bytes for all frames to or from the host, and/or other like statistics.

In one embodiment, the Ethernet LAN statistics may include a variety of multi-host statistics, such as, for a pair of hosts. The multi-host statistics may include any combination of the following: the number of frames from a first host to a second host, the number of frames from the second host to the first host, the number of frames between the first host and the second host, the number of bytes from the first host to the second host, the number of bytes from the second host to the first host, the number of bytes between the first host and the second host, the percent of all frames that are from the first host to the second host, the percent of all frames that are from the second host to the first host, the percent of all frames that are the conversation between the first host and the second host, the percent of all bytes that are from the first host to the second host, the percent of all bytes that are from the second host to the first host, the percent of all bytes that are the conversation between the first host and the second host, the percent of the theoretical bandwidth used by data from the first host to the second host, the percent of the theoretical bandwidth used by data from the second host to the first host, the percent of the theoretical bandwidth used by the conversation between the first host and the second host, the average size in bytes for frames from the first host to the second host, the average size in bytes for frames from the second host to the first host, the average size in bytes for all frames between the first host and the second host, the number of errors from the first host to the second host, the number of errors from the second host to the first host, the number of errors between the first host and the second host, and/or other like statistics.

In one embodiment, the Ethernet LAN statistics may include a variety of multi-host, network-layer statistics, such as, for a particular virtual LAN. The multi-host, network-layer statistics may include any combination of the following: the number of frames from a first host to a second host, the number of frames from the second host to the first host, the number of frames between the first host and the second host, the number of bytes from the first host to the second host, the number of bytes from the second host to the first host, the number of bytes between the first host and the second host, the percent of all frames that are from the first host to the second host, the percent of all frames that are from the second host to the first host, the percent of all frames that are the conversation between the first host and the second host, the percent of all bytes that are from the first host to the second host, the percent of all bytes that are from the second host to the first host, the percent of all bytes that are the conversation between the first host and the second host, the percent of the theoretical bandwidth used by data from the first host to the second host, the percent of the theoretical bandwidth used by data from the second host to the first host, the percent of the theoretical bandwidth used by the conversation between the first host and the second host, the average size in bytes for frames from the first host to the second host, the average size in bytes for frames from the second host to the first host, the average size in bytes for all frames between the first host and the second host, and/or other like statistics.

In one embodiment, the Ethernet LAN statistics may include a variety of multi-host, application-layer statistics, such as, for a particular virtual LAN identifier and application protocol. The multi-host, application-layer statistics may include any combination of the following: the number of frames from a first host to a second host, the number of frames from the second host to the first host, the number of frames between the first host and the second host, the number of bytes from the first host to the second host, the number of bytes from the second host to the first host, the number of bytes between the first host and the second host, the percent of all frames that are from the first host to the second host, the percent of all frames that are from the second host to the first host, the percent of all frames that are the conversation between the first host and the second host, the percent of all bytes that are from the first host to the second host, the percent of all bytes that are from the second host to the first host, the percent of all bytes that are the conversation between the first host and the second host, the percent of the theoretical bandwidth used by data from the first host to the second host, the percent of the theoretical bandwidth used by data from the second host to the first host, the percent of the theoretical bandwidth used by the conversation between the first host and the second host, the average size in bytes for frames from the first host to the second host, the average size in bytes for frames from the second host to the first host, the average size in bytes for all frames between the first host and the second host, and/or other like statistics.

In one embodiment, the Ethernet LAN statistics may include a variety of utilization-related statistics, which may include any combination of the following: the number of frames captured, the number of frames received, the number of broadcast frames, the number of multicast frames, the number of unicast frames, the number of bytes received, the percentage of the max theoretical throughput used, and/or other like statistics.

In one embodiment, the Ethernet LAN statistics may include a variety of error-related statistics, which may include any combination of the following: the number of frame errors, the number of CRC alignment errors, the number of undersized frames, the number of oversized frames, the number of frame fragments, the number of jabber frames, the number of collisions, the number of packets dropped, and/or other like statistics.

In one embodiment, the Ethernet LAN statistics may include a variety of frame-size statistics, which may include any combination of the following: the total number of frames, the total number of bytes, the number of undersize frames, the percent of all frames that are undersized, the number of frames 64 bytes long, the percent of all frames that are 64 bytes long, the number of frames 65-127 bytes long, the percent of all frames that are 65-127 bytes long, the number of frames 128-255 bytes long, the percent of all frames which are 128-255 bytes long, the number of frames 256-511 bytes long, the percent of all frames that are 256-511 bytes long, the number of frames 512-1103 bytes long, the percent of all frames that are 512-1103 bytes long, the number of frames 1104-1518 bytes long, the percent of all frames that are 1104-1518 bytes long, the number of oversize frames, the percent of all frames that are oversized, the average size in bytes for all frames, and/or other like statistics.

In one embodiment, the statistics may include a variety of other host-specific, application-layer statistics, such as, for a particular application protocol. These host-specific, application-layer statistics may include a minimum response time for a host, a maximum response time for a host, an average response time for a host, a total response time for a host, a number of connections to the host for a particular application protocol, and/or other like statistics.

Of course, any of the Ethernet LAN statistics may be used for any suitable type of network other than a LAN using any suitable protocol other than Ethernet.

Exemplary SAN Statistics

As described above, a diagnostic module 108 and/or a statistics module 130 may generate a variety of statistics. In some embodiments, statistics may be generated for Ethernet LANs or other networks. In some embodiments, statistics may be generated for SANs.

In one embodiment, the SAN statistics may include a variety of Fibre Channel link metrics, which may include any combination of the following: the total number of frames of any type per second, the total megabytes of frame payload data per second (which may exclude the SOF, Header, CRC, and EOF portions of the frame), the total number of SCSI frames per second (which may include SCSI Command, Transfer Ready, Data and Status frames), the total megabytes of SCSI frame payload data per second (which may include SCSI Command, Transfer Ready, Data and Status frames, but may exclude the SOF, Header, CRC or EOF), the total number of Fibre Channel management frames per second (which may include Extended Link Services or ELS, Basic Link Services or BLS, Fibre Channel Services or FCS, Link Control or LC, and Fabric Frames or SOF(f)), the total megabytes of FC Management frame payload data per second (which may include ELS, BLS, FCS, LC, and SOF(f), but may exclude the SOF, Header, CRC or EOF), the total number of Non-Management and Non-SCSI frames per second, the total megabytes of Non-Management and Non-SCSI frame payload data per second (which may not include the SOF, Header, CRC or EOF), total application data frames per second (which may include solicited and unsolicited data frames), total megabytes of application payload data per second (which may include the payload of solicited and unsolicited data frames), the percentage of total theoretical bus capacity consumed by the payload bytes, the percentage of total theoretical bus capacity consumed by Fibre Channel management frames, the percentage of total theoretical bus capacity consumed by the SCSI frame payload bytes, the percentage of total theoretical bus capacity consumed by the Non-SCSI and Non-Management frame payload bytes, and/or other like statistics.

In one embodiment, the SAN statistics may include a variety of Fibre Channel link event statistics, which may include any combination of the following: the number of times a link has transitioned into a Loss of Sync state in an interval, the number of times a link has transitioned to a Loss of Signal state in an interval, the number of primitive sequences of LIP events (e.g., when a LIP event reinitializes the FC loop and thus cancels all outstanding I/O's), the number of primitive sequences of NOS and OLS events (e.g., when a NOS/OLS event reinitializes the FC link and thus cancels all outstanding I/O's), the number of Fibre Channel Extended Link Services Frames (such as, LOGO, PLOGI, ACC, and the like) in an interval, the number of Fibre Channel Services Frames (such as, Directory Server Management and FC-AL Management) in an interval, the number of Fabric Frames (such as, frames that begin with the SOF(f) primitive) in an interval, the number of Basic Link Services Frames (such as, ABTS, BA_ACC, BA_RJT, and the like) in an interval, the number of Link Control Frames (which may include P_RJT, F_RJT, F_BSY, and may exclude ACK) in an interval, the number of times a link has returned to an Idle state after any LOS, LOSIG, LIP or NOS/OLS events, the number of SCSI Check Condition Status Frames in an interval, the number of SCSI Bad Status Frames (which may include QueueFull, Busy, Condition Met, and the like; but may exclude SCSI Check Condition Status Frames) in an interval, the number of SCSI Task Management Frames (such as, Target Reset, LUN Reset, Clear ACA, and the like) in an interval, the number of FC Code Violations (such as, a bit error or a disparity error that occurred in a Fibre Channel word) in an interval, framing errors that may occur on any link with media or a transmission problems (such as, bad or missing CRC; bad or missing SOF/EOF values; improperly truncated frames, such as, jabber or runt frames; EOFa, EOFni, and EOFdti frames; and the like), and/or other like statistics.

In one embodiment, the SAN statistics may include a variety of Fibre Channel link group statistics, which may include any combination of the following: the number of Login type frames (such as, FLOGI, PLOGI, PRLI, ADISC, PDISC, and FDISC frames) in an interval, the number of Logout type frames (such as, LOGO, PRLO, and TPRLO frames) in an interval, the number of ABTS frames in an interval, the number of Notification type frames (such as, FAN and RSCN frames) in an interval, the number of Reject type frames (such as, LS_RJT, BA_RJT, P_RJT, and F_RJT frames) in an interval, the number of Busy type frames (such as, P_BSY and F_BSY frames) in an interval, the number of Accept type frames (such as, BA_ACC and ACC frames) in an interval, the number of Loop Initialization frames (such as, LISM, LIFA, LIPA, LIHA, LISA, LIRP, and LILP frames) in an interval, and/or other like statistics.

In one embodiment, the SAN statistics may include a variety of SCSI link pending exchange statistics, which may include any combination of the following: the number of exchanges that have been opened, but not closed in an interval; the maximum number of exchanges open at one time during an interval, and/or other like statistics. In one embodiment, the SAN statistics may include a variety of initiator-target/LUN statistics, such as, for conversations between a given initiator and a given SCSI target and/or Logical Unit Number (collectively ITL). The initiator-target/LUN statistics may include any combination of the following: the amount of overall bus capacity utilized by SCSI exchanges between the specified ITL, the number of frames per second used by SCSI exchanges between the specified ITL, the frames/sec metric for the specified ITL expressed as a percentage of all frames sent this second, the number of megabytes of frame payload sent per second between the specified ITL (which may exclude the SOF, Header, CRC or EOF), the MB/sec metric for the specified ITL expressed as a percentage of all MB sent this second, the number of SCSI Task Management Frames (such as, Target Reset, LUN Reset, Clear ACA, and the like) for the specified ITL in an interval, the number of SCSI Bad Status Frames (which may include QueueFull, Busy, Condition Met, but may exclude SCSI Check Condition Status Frames) for the specified ITL in an interval, the number of SCSI Check Condition Status Frames for this ITL in an interval, the number of SCSI exchanges aborted during this interval, and/or other like statistics.

In one embodiment, the SAN statistics may include a variety of initiator-target/LUN statistics for a storage device, which may include any combination of the following: the total amount of elapsed time from the SCSI Read Command to the First Data for all exchanges for a specified ITL that completed in an interval, the average amount of elapsed time from the SCSI Read Command to the First Data for all exchanges for a specified ITL that completed in an interval, the minimum amount of elapsed time from the SCSI Read Command to the First Data for all exchanges for a specified ITL that completed in an interval, the maximum amount of elapsed time from the SCSI Read Command to the First Data for all exchanges for a specified ITL that completed in an interval, and/or other like statistics.

In one embodiment, the SAN statistics may include a variety of initiator-target/LUN statistics for various types of exchanges, such as, a read exchange, a write exchange, or other exchange. The ITL exchange statistics may include any combination of the following: the total number of frames per second used by the exchanges between the specified ITL, the total number of megabytes per second used by the exchanges between the specified ITL (which may include the SOF, Header, CRC or EOF), the number of commands issued for the specified ITL in an interval, the number of commands completed for the specified ITL in an interval, the total amount of elapsed time for the SCSI exchanges for the specified ITL that completed in an interval, the average amount of elapsed time per SCSI exchange for the specified ITL that completed in an interval, the minimum amount of elapsed time per SCSI exchange for the specified ITL that completed in this interval, the maximum amount of elapsed time per SCSI exchange for the specified ITL that completed in an interval, the minimum number of data bytes requested for any SCSI exchange for the specified ITL that completed in an interval, the maximum number of data bytes requested for any SCSI exchange for the specified ITL that completed in an interval, and/or other like statistics.

In one embodiment, the SAN statistics may include a variety of SCSI link pending exchange statistics for a specified, which may include any combination of the following: the number of exchanges that have been opened, but not closed in an interval; the maximum number of exchanges open at one time during an interval, and/or other like statistics.

In one embodiment, the SAN statistics may include a variety of SCSI status metrics that indicate one or more of the following: a SCSI status value associated with a frame, one or more sense codes associated with a frame, a timestamp indicating when the frame was observed, an ITL value, and any other suitable information.

In one embodiment, the SAN statistics may include any of a variety of vSAN statistics for at least one vSAN.

Of course, any of the SAN statistics may be used for any suitable type of network other than a SAN or vSAN using any suitable protocol other than Fibre Channel.

Exemplary Operating and Computing Environments

The methods and systems described above can be implemented using software, hardware, or both hardware and software. For example, the software may advantageously be configured to reside on an addressable storage medium and be configured to execute on one or more processors. Thus, software, hardware, or both may include, by way of example, any suitable module, such as software components, object-oriented software components, class components and task components, processes, functions, attributes, procedures, subroutines, segments of program code, drivers, firmware, microcode, circuitry, data, databases, data structures, tables, arrays, variables, field programmable gate arrays ("FPGA"), a field programmable logic arrays ("FPLAs"), a programmable logic array ("PLAs"), any programmable logic device, application-specific integrated circuits ("ASICs"), controllers, computers, and firmware to implement those methods and systems described above. The functionality provided for in the software, hardware, or both may be combined into fewer components or further separated into additional components. Additionally, the components may advantageously be implemented to execute on one or more computing devices. As used herein, "computing device" is a broad term and is used in its ordinary meaning and includes, but is not limited to, devices such as, personal computers, desktop computers, laptop computers, palmtop computers, a general purpose computer, a special purpose computer, mobile telephones, personal digital assistants (PDAs), Internet terminals, multi-processor systems, hand-held computing devices, portable computing devices, microprocessor-based consumer electronics, programmable consumer electronics, network PCs, minicomputers, mainframe computers, computing devices that may generate data, computing devices that may have the need for storing data, and the like.

Also, one or more software modules, one or more hardware modules, or both may comprise a means for performing some or all of any of the methods described herein. Further, one or more software modules, one or more hardware modules, or both may comprise a means for implementing any other functionality or features described herein.

Embodiments within the scope of the present invention also include computer-readable media for carrying or having computer-executable instructions or data structures stored thereon. Such computer-readable media can be any available media that can be accessed by a computing device. By way of example, and not limitation, such computer-readable media can comprise any storage device or any other medium which can be used to carry or store desired program code means in the form of computer-executable instructions or data structures and which can be accessed by a computing device.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a computing device to perform a certain function or group of functions. Data structures include, for example, data frames, data packets, or other defined or formatted sets of data having fields that contain information that facilitates the performance of useful methods and operations. Computer-executable instructions and data structures can be stored or transmitted on computer-readable media, including the examples presented above.

The methods and systems described above require no particular component or function. Thus, any described component or function—despite its advantages—is optional. Also, some or all of the described components and functions described above may be used in connection with any number of other suitable components and functions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A network diagnostic system comprising:
   a first tier that includes:
      a network diagnostic module configured to generate one or more network diagnostic statistics;
         the network diagnostic module being configured to, when connected to a first link transmitting data at a first data transmission rate, automatically apply the first data transmission rate to receive first data from the first link and generate one or more first network diagnostic statistics using at least a portion of the first data when the network diagnostic module is in sync with the first link and to generate one or more second network diagnostic statistics when the diagnostic module is not in sync with the first link;
         the network diagnostic module being configured to, when disconnected from the first link and connected to a second link transmitting data at a second data transmission rate that is different from the first data transmission rate, automatically apply the second data transmission rate to receive second data from the second link and generate one or more third network diagnostic statistics using at least a portion of the second data when the network diagnostic module is in sync with the second link and to generate one or more fourth network diagnostic statistics when the diagnostic module is not in sync with the second link;
   a second tier configured to collect statistics generated by the diagnostic module; and
   a third tier configured to provide visualizations of the collected statistics.

2. The network diagnostic system of claim 1, further comprising a printed circuit board that includes the network diagnostic module.

3. The network diagnostic system of claim 1, further comprising a chassis computing system that includes at least one blade that includes the network diagnostic module.

4. The network diagnostic system of claim 1, further comprising an appliance that includes the network diagnostic module and a storage device.

5. The network diagnostic system of claim 1, wherein the first data transmission rate is approximately x; wherein $x=((1.0625 \text{ Gigabits/second})*a)$; and wherein a is an integer greater than 0.

6. The network diagnostic system of claim 5, wherein the second data transmission rate is approximately y; wherein $y=((1.0625 \text{ Gigabits/second})*b)$ or $((1.25 \text{ Gigabits/second})*b)$ or $((1.5 \text{ Gigabits/second})*b)$; and wherein b is an integer greater than 0.

7. The network diagnostic system of claim 1, wherein the first data transmission rate is approximately x; wherein $x=((1.25 \text{ Gigabits/second})*a)$; and wherein a is an integer greater than 0.

8. The network diagnostic system of claim 7, wherein the second data transmission rate is approximately y; wherein $y=((1.0625 \text{ Gigabits/second})*b)$ or $((1.25 \text{ Gigabits/second})*b)$ or $((1.5 \text{ Gigabits/second})*b)$; and wherein b is an integer greater than 0.

9. The network diagnostic system of claim 1, wherein the first data transmission rate is approximately x; wherein $x=((1.5 \text{ Gigabits/second})*a)$; and wherein a is an integer greater than 0.

10. The network diagnostic system of claim 9, wherein the second data transmission rate is approximately y; wherein $y=((1.0625 \text{ Gigabits/second})*b)$ or $((1.25 \text{ Gigabits/second})*b)$ or $((1.5 \text{ Gigabits/second})*b)$; and wherein b is an integer greater than 0.

11. A network diagnostic system comprising:
    a first tier that includes:
       a network diagnostic module comprising:
          a message receiving module configured to, when disconnected from a first link transmitting data at a first data transmission rate and connected to a second link transmitting data at a second data transmission rate that is different from the first data transmission rate, automatically apply the second data transmission rate to receive first data from the second link; and
          a statistics module configured to generate one or more first network diagnostic statistics using at least a portion of the first data from the second link when the network diagnostic module is in sync with the second link and to generate one or more second network diagnostic statistics when the diagnostic module is not in sync with the second link;

a second tier configured to collect statistics generated by the diagnostic module; and a third tier configured to provide visualizations of the collected statistics.

12. The network diagnostic system of claim 11, wherein the first data from the second link comprises a plurality of network messages; wherein the message receiving module is configured to process the plurality of network messages into at least one message having an alternate structure; and wherein the statistics module configured to generate one or more network diagnostic statistics using the at least one message having an alternate structure.

13. The network diagnostic system of claim 11, further comprising a printed circuit board that includes the network diagnostic module.

14. The network diagnostic system of claim 11, further comprising a chassis computing system that includes at least one blade that includes the network diagnostic module.

15. The network diagnostic system of claim 11, further comprising an appliance that includes the network diagnostic module and a storage device.

* * * * *